US012032663B2

(12) United States Patent
Murdoch et al.

(10) Patent No.: US 12,032,663 B2
(45) Date of Patent: Jul. 9, 2024

(54) CROSS-SESSION ISSUANCE OF VERIFIABLE CREDENTIAL

(71) Applicant: Microsoft Technology Licensing, LLC, Redmond, WA (US)

(72) Inventors: Brandon Murdoch, Reading (GB); Ankur Patel, Sammamish, WA (US); Sydney Morton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

(21) Appl. No.: 17/348,663

(22) Filed: Jun. 15, 2021

(65) Prior Publication Data

US 2022/0398299 A1 Dec. 15, 2022

(51) Int. Cl.
*G06F 7/04* (2006.01)
*G06F 15/16* (2006.01)
*G06F 21/31* (2013.01)
*H04L 9/30* (2006.01)
*H04L 29/06* (2006.01)

(52) U.S. Cl.
CPC .............. *G06F 21/31* (2013.01); *H04L 9/30* (2013.01)

(58) Field of Classification Search
CPC ................................. G06F 21/31; H04L 9/30
USPC ............................................................ 726/6
See application file for complete search history.

(56) References Cited

U.S. PATENT DOCUMENTS

| 10,484,376 | B1* | 11/2019 | Laucius ................ H04L 9/3247 |
| 2017/0372048 | A1 | 12/2017 | Liu et al. |
| 2018/0077138 | A1 | 3/2018 | Bansal et al. |
| 2018/0336612 | A1* | 11/2018 | Bullard, III ........... H04L 9/3234 |
| 2019/0305964 | A1* | 10/2019 | Hamel ................... H04L 9/0891 |

FOREIGN PATENT DOCUMENTS

| CN | 110278084 | * | 9/2019 | ......... H04L 61/3015 |
| CN | 110278084 A | * | 9/2019 | ......... H04L 61/3015 |
| CN | 110278084 A | | 9/2019 | |

OTHER PUBLICATIONS

"International Search Report and Written Opinion Issued in PCT Application No. PCT/US22/028868", Mailed Date: Aug. 12, 2022, 15 Pages.

* cited by examiner

Primary Examiner — Jeffrey C Pwu
Assistant Examiner — Samuel Ambaye
(74) Attorney, Agent, or Firm — Workman Nydegger

(57) ABSTRACT

Cross-session acquisition of a verifiable credential. The first session includes generating a user secret known to the first session and to the user, and the generation of an encrypted identity token that includes claims about authentication of the user and the user secrete. In the second session, a second computing system uses the acquired identity token to get a verifiable credential. The user is prompted to prove knowledge of the user secret within the identity token. In response to successful proof of this knowledge and validation of the identity token, the issuer system issues a verifiable credential that relies upon one or more claims that were included within the identity token, and then provides the verifiable credential to the user.

19 Claims, 8 Drawing Sheets

CROSS-SESSION ISSUANCE OF VERIFIABLE CREDENTIAL

BACKGROUND

Existing computing technologies provide for a data structure called a "verifiable credential". In these technologies, a claims issuer makes one or more claims about a subject, and generates the verifiable credential. Each claim includes a property-value pair. The verifiable credential include those claim(s) as well as proof instructions (e.g., metadata) to prove that claim(s) have not been tampered with and were indeed issued by the claims issuer. The claims issuer then provides the verifiable credential to a claims holder, for presentation to any relying party that relies upon the veracity of those claims. The relying party computing system then follows the proof instructions to thereby prove that the claim is true.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein permit for cross-session acquisition of a verifiable credential. In this acquisition process there is a first session and a second session. The first session is established between an end-user and a first computing system. The first session includes the first computing system determining that a verifiable credential associated with the user is to be generated. The first computing system generates a user secret known to the first session and to the user. Furthermore, as part of the first session, an identity token is acquired that contains claims about an authentication of the user and the user secret. The first computing system then causes the identity token to be provided to a second computing system in control of the user and for use by the second computing system in the second session.

In the second session, the second computing system uses the acquired identity token to get a verifiable credential. The second session is established between the second computing system (and its user) and an issuer system that issues the verifiable credential. In the second session, the second computing system provides the identity token to the issuer system with a request to issue a verifiable credential based on the identity token. The user is prompted to prove knowledge of the user secret within the identity token. The issuer computing system validates the identity token, and receives the proof that the end-user of the second computing system knows the user secret. In response, the issuer system issues a verifiable credential that relies upon one or more claims that were included within the identity token.

Thus, the user can initiate creation of a verifiable credential in one session, and acquire the verifiable credential in a second session. Accordingly, the user can initiate verifiable credential creation on a computing system that is not capable of itself generating the verifiable credential.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
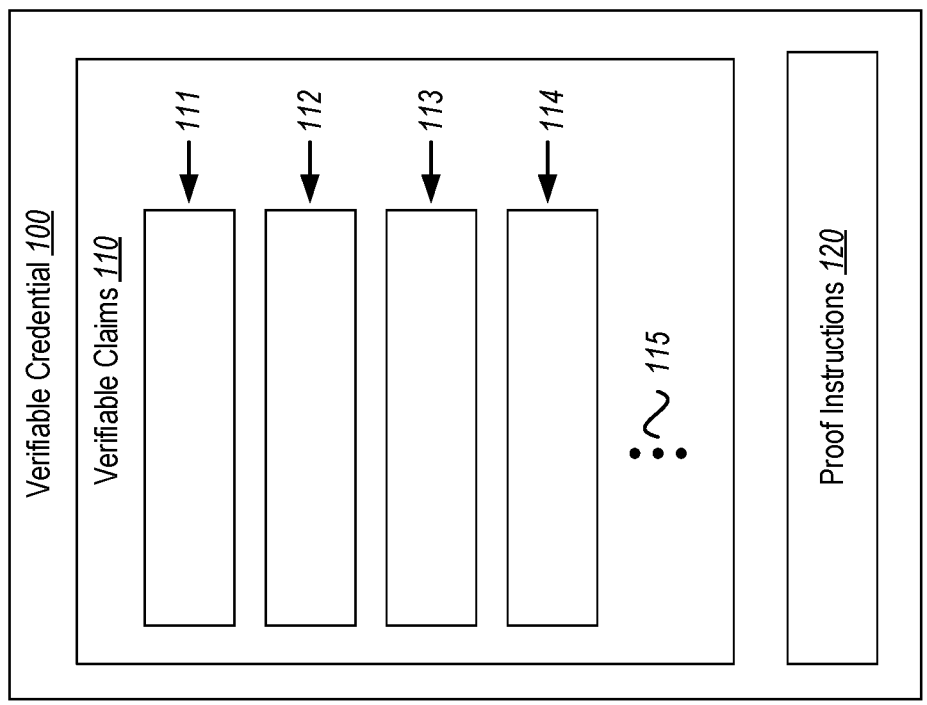
FIG. 1 illustrates a verifiable credential that includes multiple verifiable claims, and proof instructions for proving the claims were made by an issuer.

The principles described herein permit for cross-session acquisition of a verifiable credential. In this acquisition process there is a first session and a second session. The first session is established between an end-user and a first computing system. The first session includes the first computing system determining that a verifiable credential associated with the user is to be generated. The first computing system generates a user secret known to the first session and to the user. Furthermore, as part of the first session, an identity token is acquired that contains claims about an authentication of the user and the user secret. The first computing system then causes the identity token to be provided to a second computing system in control of the user and for use by the second computing system in the second session.

In the second session, the second computing system uses the acquired identity token to get a verifiable credential. The second session is established between the second computing system (and its user) and an issuer system that issues the verifiable credential. In the second session, the second computing system provides the identity token to the issuer system with a request to issue a verifiable credential based on the identity token. The user is prompted to prove knowledge of the user secret within the identity token. The issuer computing system validates the identity token, and receives the proof that the end-user of the second computing system knows the user secret. In response, the issuer system issues a verifiable credential that relies upon one or more claims that were included within the identity token.

Thus, the user can initiate creation of a verifiable credential in one session, and acquire the verifiable credential in a second session. Accordingly, the user can initiate verifiable credential creation on a computing system that is not capable of itself generating the verifiable credential.

In order to introduce the reader to the concept of a verifiable credential, an example verifiable credential 100 will first be described with respect to FIG. 1. Furthermore, an environment 200 in which a verifiable credential is created and used will then be described with respect to FIG. 2. Thereafter, the principles of the embodiments herein will be described with respect to FIGS. 3 to 8.

As used herein, an "issuer" is an entity that makes at least one assertion about a subject. That assertion is also called herein a "claim". A "credential" is a set of one or more claims. As the term is used herein, a "credential" can include claims made by multiple issuers, but the term also applies to a set of claims having a single issuer. A "verifiable credential" is a credential in which cryptographic mechanisms (such as a digital signature) are used to detect whether the credential has been tampered with since the time that the credential was issued, and can be used to verify identity of the issuer of the credential. Claims within a verifiable credential need not be about the same subject, and the subject of any claim need not be the same as a holder of the verifiable credential.

FIG. 1 illustrates a verifiable credential 100 that includes multiple verifiable claims 110. The verifiable claims 110 are shown as including four verifiable claims 111 through 114, though the ellipsis 115 represents that the verifiable credential 100 may include any number (one or more) of verifiable claims. The verifiable credential 100 also includes proof instructions 120 that are used to verify that the verifiable credential 100 has not been tampered with since the verifiable credential 100 was created by the issuer of the verifiable credential 100, and to verify the identity of the issuer of the verifiable claims 110. An example of a proof instruction is a digital signature of the issuer. Verifiable credentials in which proof instructions are used to prove claims are known in the art.

Figure 2:
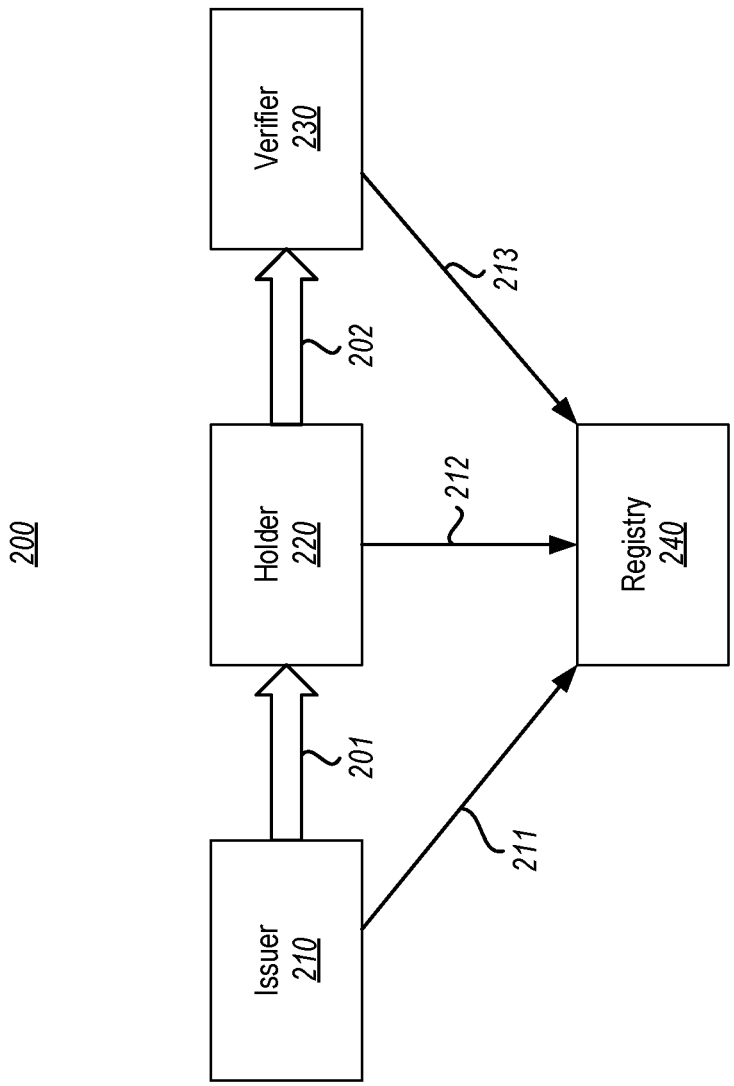
FIG. 2 illustrates an environment in which a verifiable credential (such as the verifiable credential of FIG. 1) is created and used.

FIG. 2 illustrates an environment 200 in which a verifiable credential (such as verifiable credential 100 of FIG. 1) is created and used. The environment 200 includes an issuer computing system 210 that operates within a sphere of trust of an issuer. Examples of issuers include corporations, organizations, associations, governments, agencies, individuals, or any other entity that can make assertions that could be relied upon by others. The issuer performs the role of asserting claims, causing the issuer computing system 210 to create a verifiable credential (such as verifiable credential 100 of FIG. 1) for these claims, and causing the issuer computing system 210 to transmit the verifiable credential to a holder computing system 220 as represented by arrow 201. The issuer computing system 210 may also be referred to herein as simply "issuer system 210" and its user referred to as an "issuer". As represented by arrow 211, the issuer system 210 also transmits verify identifiers and use schemas to a registry computing system 240.

As also represented by arrow 201, a holder computing system 220 acquires the transmitted verifiable credential. The holder computing system 220 operates on behalf of a holder, who uses the holder computing system 220 to possess and potentially store the verifiable credential. As represented by arrow 202, the holder also causes the holder computing system to present the verifiable credential to a verifier computing system 230. The holder computing system 220 may also be referred to herein as simply "holder system 220" and its user referred to as a "holder". As represented by arrow 212, the holder system 220 also transmits identifiers and use schemas to the registry computing system 240.

The holder system 220 presents the verifiable credential itself, or presents data from the verifiable credential in the form of another data structure, which may also be referred to herein as a "verifiable presentation". A verifiable presentation expresses data from one or more verifiable credentials, and is packaged in such a way that the authorship of the data is verifiable. If verifiable credentials are presented directly, they become verifiable presentations. Data formats derived from verifiable credentials that are cryptographically verifiable, but do not of themselves contain verifiable credentials, are also included within the definition of a verifiable presentation. In addition to presenting the verifiable credential to relying parties, the holder system also may present a digital wallet 221 to the holder, which presents a visualization for each of one or more of the verifiable credentials held by the holder system 220.

As also represented by the arrow 202, a verifier computing system 230 acquires the transmitted verifiable credential (optionally within a verifiable presentation). The verifier computing system 230 operates on behalf of a verifier, which is a relying party that relies on one or more claims made in the verifiable credential. The verifier computing system 230 evaluates whether a verifiable credential is an untampered with (and unexpired) statement of the issuer. This includes following any proof instructions (e.g., proof instructions 120) that are present within the verifiable credential (e.g., verifiable credential 100). The verifier computing system 230 then may take action based on this verification, such as treating the claim(s) made in the verifiable credential as being valid and issued by the issuer.

The verifier computing system 230 will sometimes also be referred to hereinafter as "verifier system 230" and its user referred as a "verifier". As part of the verification, the verifier 230 sends verify identifiers and schemas to the registry computing system 240, as represented by arrow 213. The users of the issuer system 210, the holder system 220 and the verifier system 230 may be a human, organization, or other entity. For instance, an issuer could be a cloud service.

The registry computing system 240 mediates the creation and verification of identifiers, keys, verifiable credential schemas, revocation registries, issuer public keys, and so on. Example verifiable data registries include trusted databases, decentralized databases, and distributed ledgers. Each of the issuer computing system 210, the holder computing system 220, the verifier computing system 230, and the registry computing system 240 is structured as described below for the computing system 800 of FIG. 8.

Figure 3:
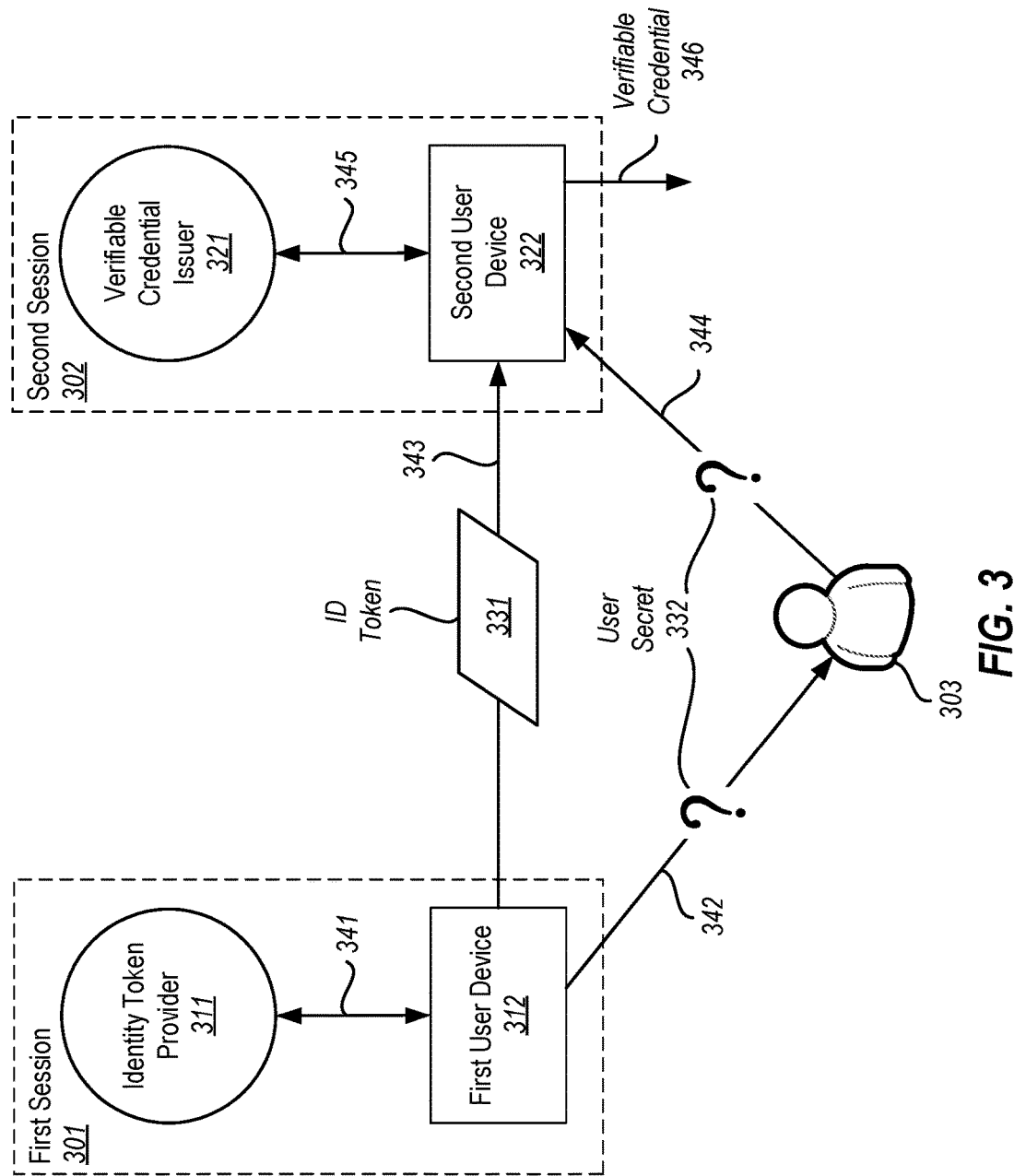
FIG. 3 illustrates a multi-session environment in which the principles described herein may operate in order to issue a verifiable credential to a user.

FIG. 3 illustrates a multi-session environment 300 in which the principles described herein may operate in order to issue a verifiable credential to a user 303. The multi-session environment 300 includes a first session 301 and a second session 302.

The first session 301 includes an exchange between a user 303, a first user device 312 and an identity token provider 311. The first session 301 results in the user 303 being made aware of a user secret 332 that is shared between the user 303 and the first session 301. The first session 301 also generates an identity token 331 that is provided along with the user secret 342 to the second session 302. The second session 302 includes an exchange between the user 303, a second user device 322 and a verifiable credential issuer 321 that results in the user 303 being issued a verifiable credential 346. The identity token provider 311, the first user device 312, the verifiable credential issuer system 321 and the second user device 322 may each be structured as described below for the computing system 800 of FIG. 8.

Figure 4:
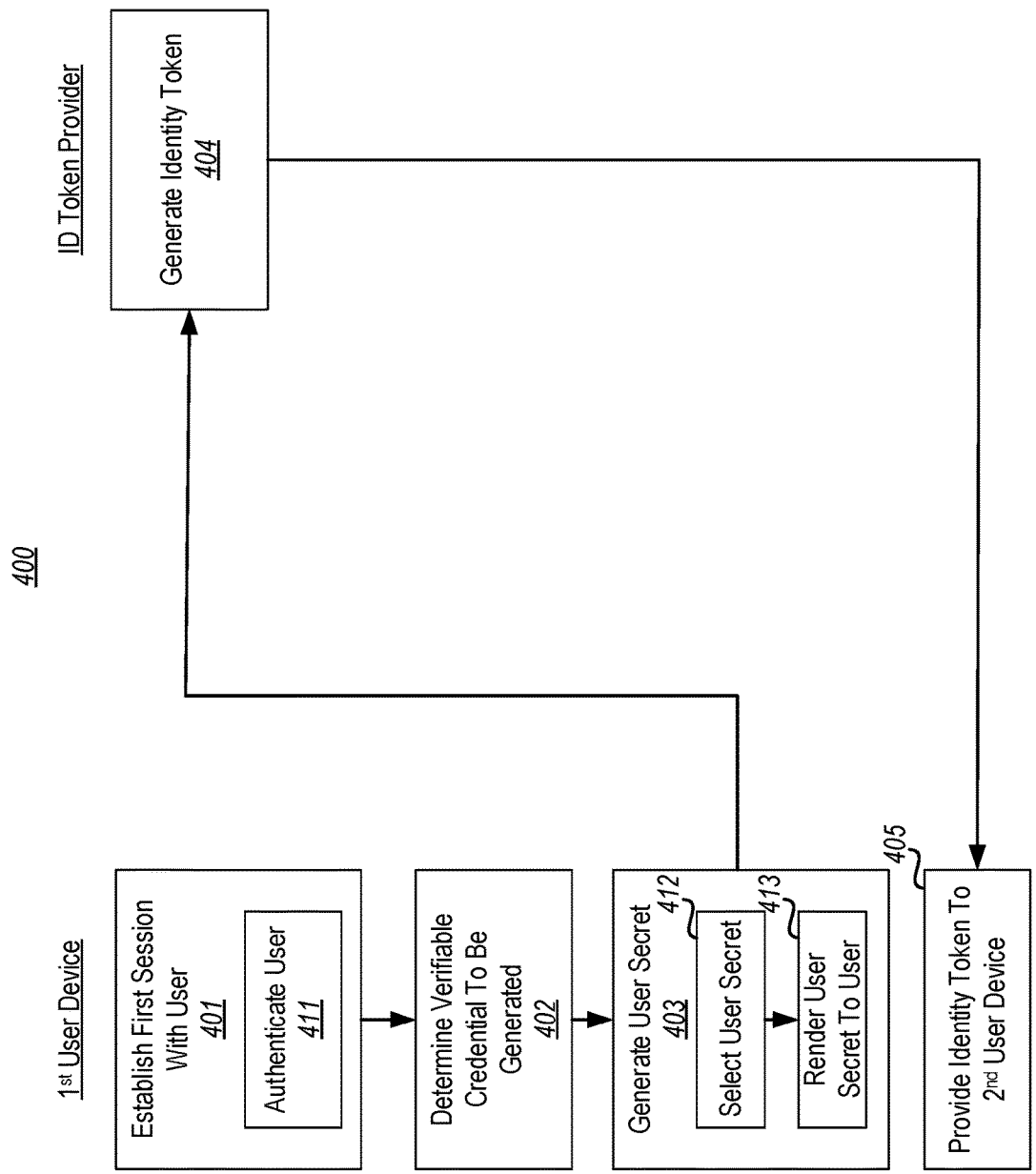
FIG. 4 illustrates a flowchart of a method for assisting a user in cross-session acquisition of a verifiable credential, in accordance with the principles described herein.

FIG. 4 illustrates a flowchart of a method 400 for assisting a user in cross-session acquisition of a verifiable credential, in accordance with the principles described herein. The method 400 may be performed by the identity token provider 311 in collaboration with the first user device 312 within the first session 301. Accordingly, the method 400 will now be described with reference to the environment 300 of FIG. 3. Acts that are performed by the first user device are illustrated in the left column of FIG. 4 under the heading "1st User Device". Acts that are performed by the identity token provider are listed in the right column of FIG. 4 under the heading "ID Token Provider".

The method 400 includes establishing a first session associated with a user of a first user device (act 401). As part of this establishment of the first session, the first user device may authenticate the user (act 411). As an example, in FIG. 3, the first user device 312 establishes a first session 301 with the user 303 of the first user device 312. If the user 303 was not already authenticated to the first user device 312 prior to the establishment of the first session, the first user device 312 may authenticate the user 303. In one example implementation referred to herein as the "kiosk example", the first user device 312 is a computing display within a store-front kiosk.

The first user device then determines that a verifiable credential associated with the user is to be generated (act 402). In the example environment 300 of FIG. 3, the first user device 312 determines that a verifiable credential associated with the user 303 is to be generated. That verifiable credential is "associated" with the user in the sense that the verifiable credential will include one or more claims where the user is the subject of those claim(s).

The first user device then generates a user secret that is known to the first session and to the user (act 403). In the example environment 300 of FIG. 3, the first user device 312 generates a user secret 332 that is then made known to the user 303. The generating of this user secret may include the first user device selecting a user secret (act 412) and then causing the user secret to be rendered (e.g., displayed) to the user (act 413). In the kiosk example, the kiosk display may display the user secret to the user.

The user secret can be any data that can be recognized by the user. As an example, the user secret could be an alphanumeric character sequence (e.g., a PIN), or perhaps an image. The user secret is "known" to the first session in that the user secret is associated with the first session 301. As a specific example, an encrypted identity token that is generated from the first session 301 may include the user secret.

The method 400 then includes acquiring an identity token that includes claims about authentication of the user as well as the user secret (act 404). The identity token may optionally also include other session information about the first session as well. In the example of FIG. 3, the first user device 312 interacts (as represented by bi-directional arrow 341) with an identity token provider 311 to cause the identity token provider 311 to generate the identity token 331. The identity token provider 311 is trusted by the verifiable credential issuer 321 to generate valid identity tokens. Alternatively, the first user device 312 could itself be an identity token provider if the first user device 312 has established trust with the verifiable credential issuer 321 to generate valid identity tokens.

Figure 5:
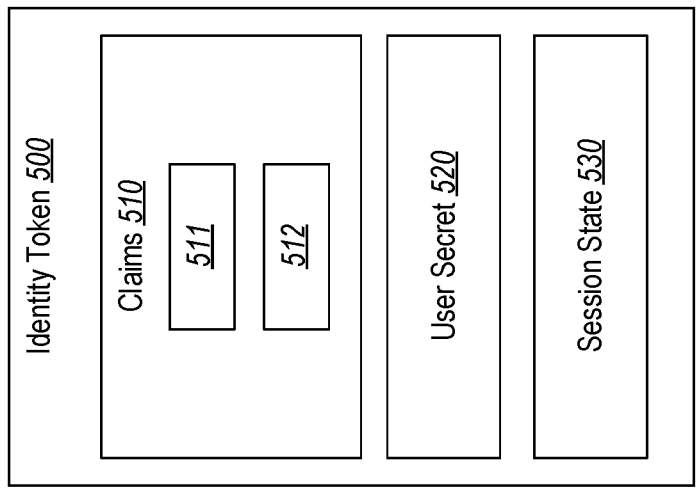
FIG. 5 illustrates a data structure of an identity token that includes claims about the authentication of the user, the user secret, and potentially other session state of the first session.

As an example, FIG. 5 illustrates a data structure of an identity token 500 that includes claims 510 about the authentication of the user, the user secret 520, and potentially other session state 530 of this first session. Here, the claims 510 about the authentication of the user include two claims 511 and 512. In one embodiment, the identity token is a JSON Web Token (a "JWT").

The identity token may be encrypted to be decryptable by the private key of the verifiable credential issuer. In the example of FIG. 3, the identity token 331 is decryptable by the verifiable credential issuer 321 using the private key of the verifiable credential issuer 321. Thus, the identity token 331 was encrypted by the public key of the verifiable credential issuer 321. Thus, the identity token may be an encrypted JSON encrypted object (a "JWE" object). While the first user device 312 could itself generate the JWE object based on its own authentication of the user 303, the first user device 312 may be a "client" as the term is used in the OATH2.0 and OPENID protocols. Alternatively, the identity token provider 311 itself may be a service that acts as a client to acquire the identity token using the OPENID protocol.

The user secret 332 rendered to the user is an example of the user secret 520 that as included also within the encrypted identity token. Thus, the user 303 knows the user secret within the identity token 331 not because the user 303 can see within the identity token 331, but because the first user device 312 rendered the user secret 332 to the user 303 (as represented by the arrow 342).

Returning to FIG. 4, the first user device then causes the identity token to be provided to a second computing system that is also in control of the user (act 405). This identity token is then used in the second session to help a verifiable credential issuer system to issue a verifiable credential for the user. In the example environment 300 of FIG. 3, first user device 312 provides (as represented by arrow 343) the identity token 331 to the second user device 322. In the second session 302, the verifiable credential issuer system 321 will use the identity token 331 to generate a verifiable credential 346 for the user 303. This providing of the identity token to the second user device (act 405) may be performed by the first user device causing a visual code to be displayed that is configured to be scanned by the second user. As an example, the first user device 312 may display a QR code that is scanned by the second user device 322. In the kiosk example, perhaps the user scans a QR code displayed on the kiosk display with the user's smart phone, where the smart phone is capable of engaging in a session with a verifiable credential issuer.

Figure 6:
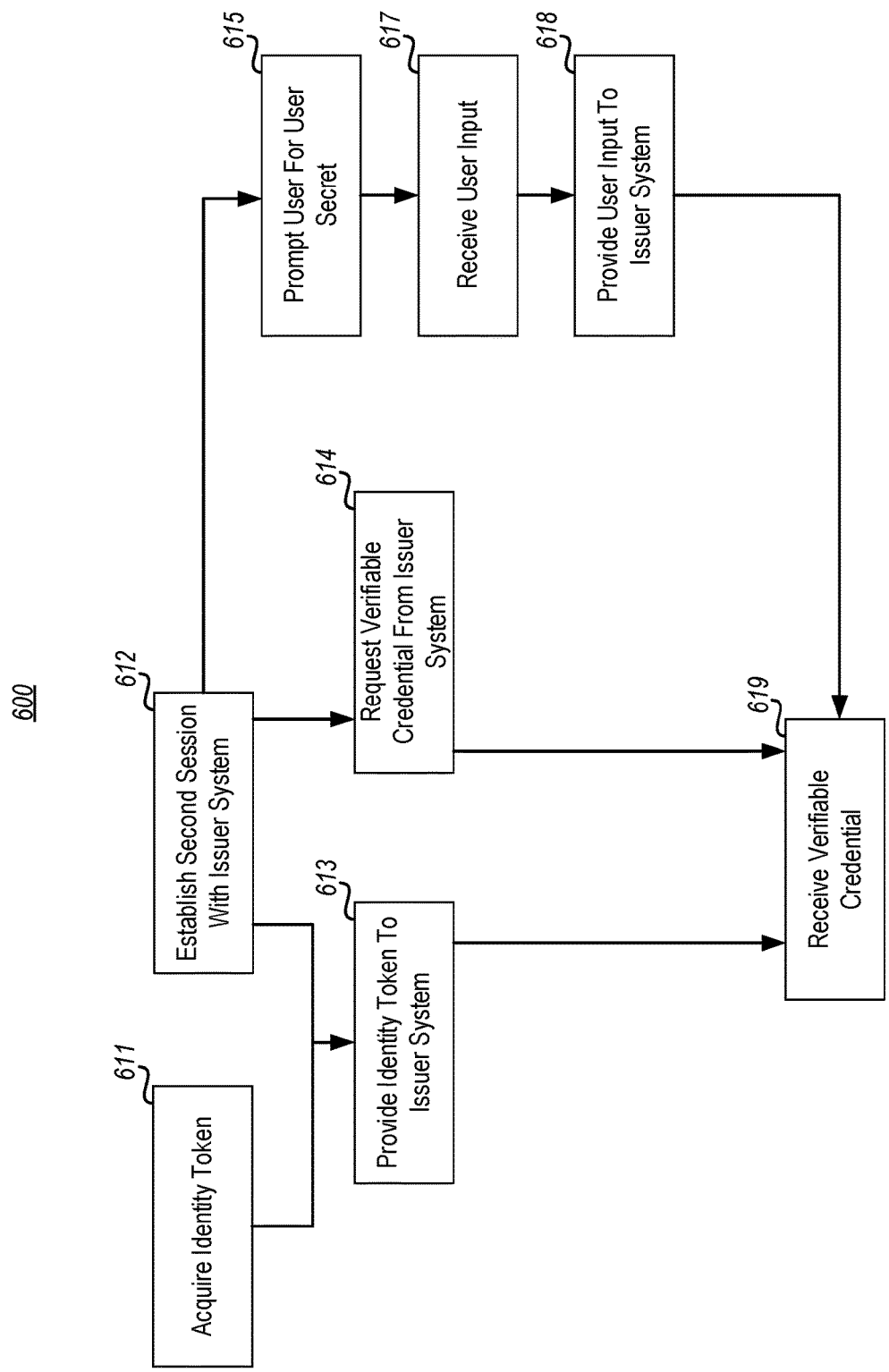
FIG. 6 illustrates a flowchart of a method for obtaining a verifiable credential in a second session using an identity token generated in a first session, in accordance with the principles described herein.

FIG. 6 illustrates a flowchart of a method 600 for obtaining a verifiable credential in a second session using an identity token generated in a first session, in accordance with the principles described herein. The method 600 may be performed within the environment 300 of FIG. 3. As an example, as part of the second session 302, the verifiable credential 346 may be generated using the identity token 331 provided (as represented by the arrow 343) by the first user device 312 to the second user device 322, as well as using the user secret 332 provided (as represented by the arrow 344) by the user 303 to the second user device 322.

In accordance with the method 600, a second computing system acquires the identity token from a first computing system (act 611). Referring to FIG. 3 as an example, the second user device 322 acquires (as represented by arrow 343) the identity token 331 from the first user device 312. As previously mentioned with reference to FIG. 5, the identity token includes one or more claims about the authentication of the user 303 made or validated in the first session 301. In addition, the identity token 331 includes a user secret made known to the user 303 as part of the first session 301. The identity token may also include other session state of the first session 301 as well. The identity token may be encrypted so that the user secret cannot be discovered by any user except the user 303 that was actually participating in the first session 301, since that user 303 is the only user to which the user secret was disclosed in the clear (as represented by arrow 342) within the first session 301.

In addition, the second computing system establishes a second session with an issuer system that issues the verifiable credential (act 612). Referring to FIG. 3, as an example, the second user device 322 establishes the second session 302 with the verifiable credential issuer 321. Arrow 345 represents the communications between the second user device 322 and the verifiable credential issuer 321 that are performed to establish the second session 302 and that are performed to communicate within the second session 302.

The acquiring of the identity token (act 611) and the establishment of the second session with the issuer system (act 612) are shown in parallel in FIG. 6. This is merely to represent that the precise order in which each act is performed is not important to the principles described herein. The second session may already be established at the time the second computing system acquires the identity token, or perhaps creation of the second session is triggered by the second computing system receiving the identity token. Either way is acceptable in accordance with the principles described herein.

After the second computing system acquires the identity token (act 611) and after the second session is established (act 612), the second computing system provides the identity token to the issuer system as part of the second session (act 613). In the example environment 300 of FIG. 3, the second user device provides the identity token 331 to the verifiable credential issuer 321. Recall that the identity token 331 is encrypted using the public key of the verifiable credential issuer 321. Accordingly, the verifiable credential issuer 321 can decrypt and read the content of the identity token 331.

The second computing system also request the verifiable credential issue a verifiable credential based on the identity token (act 614). The identity token may be provided to the issuer system within the request for the verifiable credential, or perhaps in a separate communication. Regardless, the issuer system receives the identity token and a request for a verifiable credential. The verifiable credential is "based on" the identity token in the sense that the verifiable credential includes one or more claims that rely upon one or more claims about the authentication of the user present within the identity token. As an example, the claims in the identity token about the authentication of the user may simply be the same as the claims in the verifiable credential.

The second computing system also prompts a user of the second computing system to prove knowledge of the user secret (act 615). In the example environment of FIG. 3, the second user device prompts the user 303 to demonstrate knowledge of the user secret 332. The user input representing this demonstration is represented by arrow 344. If the user secret 332 was a character sequence, the user might enter the character sequence at this point. If the user secret 332 was an image, the user 303 might demonstrate knowledge of the secret by selecting the correct image from amongst an assortment of images presented by the second user device 322. In the kiosk example, the user's smart phone may prompt the user to enter the alphanumeric sequence that was displayed (or is being displayed) on the kiosk display.

The second user device 322 may be configured to automatically prompt the user 303 for the user secret 322. Alternatively, perhaps the second user device 322 waits for the verifiable credential issuer 321 to request the proof of user knowledge prior to prompting the user for the proof.

Figure 7:
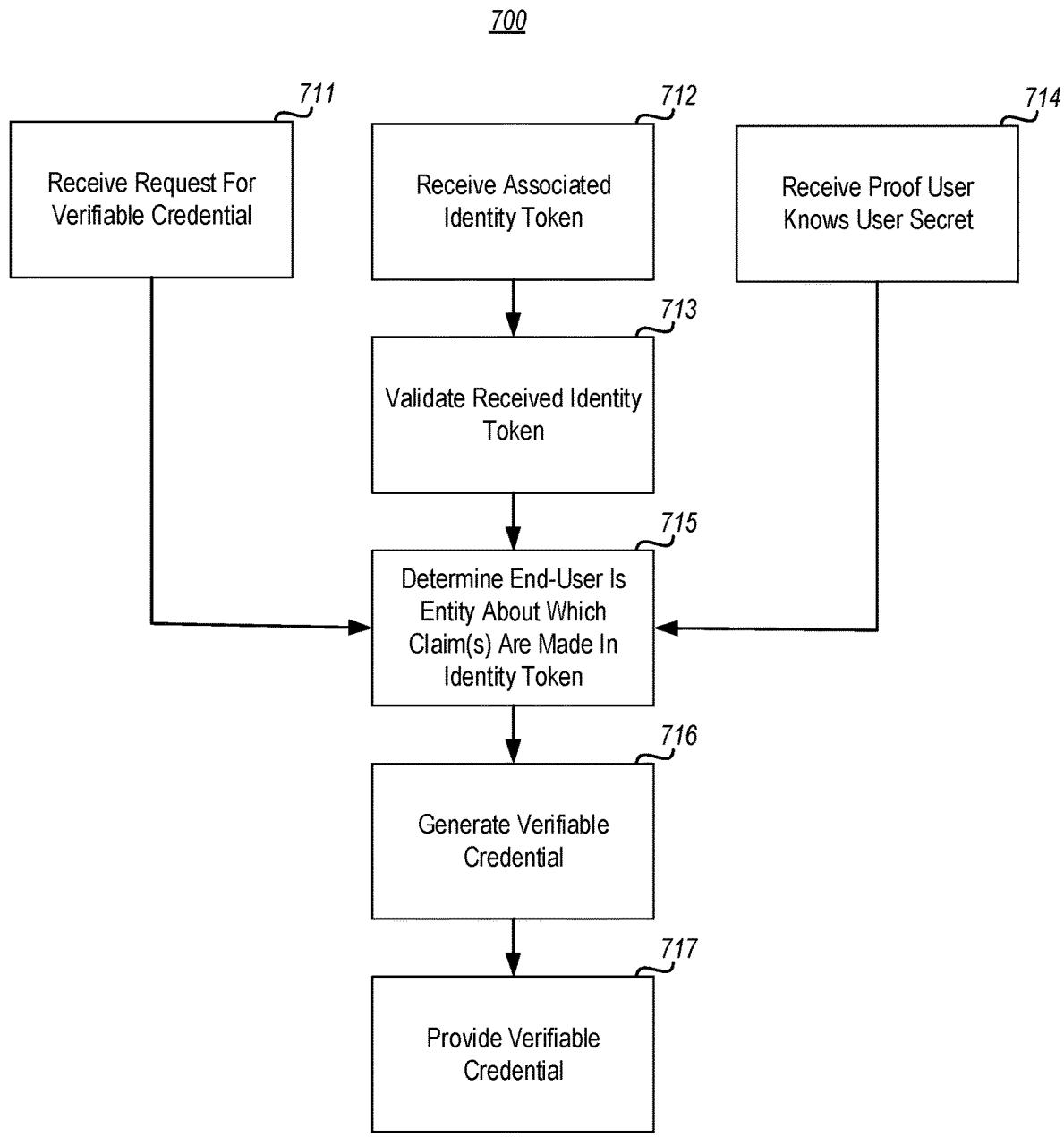
FIG. 7 illustrates a flowchart of a method for the issuer system to generate the verifiable credential, in accordance with the principles described herein.

After the second computing system receives the user input representing proof of user knowledge of the user secret (act 617), the second computing system provides the user input to the issuer system (act 618). In the environment 300 of FIG. 3, the second user device 322 provides the user input to the verifiable credential issuer 321. The issuer computing system then uses the acquired identity token and the user input representing proof of use knowledge of the user secret, and generates the verifiable credential. FIG. 7 illustrates a flowchart of a method 700 for the issuer system to generate the verifiable credential, and will be described further below.

But first, there will be some final description of FIG. 6. After the issuer system provides the verifiable credential, the second computing system receives the verifiable credential (act 619). From this point, the second user device is a holder computing system (e.g., holder 220 of FIG. 2) of the verifiable credential. As an example, in FIG. 3, the second user device 322 receives the verifiable credential from the verifiable credential issuer 321 and thereafter holds the verifiable credential (e.g., in a digital wallet). The second user device 322 may then present the verifiable credential to the first user device 312, which may then rely upon the claims made within the verifiable credential. The first user device 312 would then be a relying party such as the verifier 230 of FIG. 2. Alternatively, the second user device 322 could transfer the verifiable credential to the first user device 312, allowing the first user device 312 to be a holder (such as holder 220 of FIG. 2), and thereafter the first user device 312 could present the verifiable credential to a relying party.

In the kiosk example, the kiosk display displayed a user secret in the form of an alphanumeric pin. Also, the user scanned a QR code in order for the user's smart phone to acquire an identity token. The user's phone could then work with a verifiable credential service operating in the cloud to thereby acquire a verifiable credential that has similar claims as the identity token. The user's phone could hold the verifiable credential in a digital wallet, either locally or in the cloud. The user's smart phone could display the verifiable credential (or an associated verifiable presentation) in the form of a QR code, that could then be scanned by the kiosk. This allows the kiosk to rely upon the claims made in a formal verifiable credential if the QR code is a verifiable presentation. Alternatively, if the QR code is the verifiable credential itself, the kiosk can receive the verifiable credential and thus become a holder of the verifiable credential.

FIG. 7 illustrates a flowchart of a method 700 for the issuer system to generate the verifiable credential, and will be described further below. As mentioned above with respect to FIG. 6, the issuer system receives a request for a verifiable credential (act 711) which was provided by the requestor (e.g., in act 614 of FIG. 6). In addition, the issuer system receives an identity token associated with the request (act 712) that was provided by the requestor (e.g., in act 613 of FIG. 6). The issuer system also receives the proof that the user of the requesting computing system knows the user secret specified in the identity token (act 714) that was provided by the requestor (e.g., in act 618 of FIG. 6). In the example environment 300 of FIG. 3, the verifiable credential issuer 321 receives the identity token 331, the user input representing proof of the user knowledge of the user secret 332, and a request from the second user device 322 for a verifiable credential.

The issuer system validates the received identity token (act 713). For instance, the issuer system decrypts the identity token, verifies the signature of the identity token provider, determines that the identity token has not expired, and determines that the identity token provider is in a list of trusted identity token providers. At this point, the issuer system can determine what the user secret is by reading the decrypted identity token. The issuer system can then determine whether the user of the requesting computing system has knowledge of the user secret by comparing the user input to the user secret. For instance, in FIG. 3, the user 303 may have typed the proper character sequence, demonstrating that the user 303 of the second user device 322 in the second session 302 is indeed one in the same as the user 303 of the first session 301 in which the identity token was generated.

In response to receiving proof that the user of the requesting computing system knows the user secret, the verifiable credential determines that the user of the requesting computing system is the end-user about which authentication claims are made in the identity token (act 715). The issuer system then generates the verifiable credential (act 716) with claims that rely on (or that are) all or a subset of the claims made in the identity token. The issuer system then provides the verifiable credential to the requesting computing system (act 717).

In one embodiment, the verifiable credential issuer 321 may generate a verifiable credential using multiple identity tokens that were each generated for the user 303 in different sessions, either on the same machine or perhaps on different machines. The verifiable credential issuer 321 may defer creation of the verifiable credential until the user has proved knowledge of all of the user secrets included within all of the identity tokens. Alternatively, if the user can prove knowledge of only some of those user secrets, the verifiable credential issuer 321 might generate a verifiable credential with claims that are based on identity tokens for which the user was able to prove knowledge of the associated user secrets.

What has been described is a mechanism to initiate creation of a verifiable credential in one session, and acquire the verifiable credential in a second session. Thus, the user can initiate verifiable creation in a session that is not capable of itself generating the verifiable credential. The second session has been described as operating on a different machine as the first session. However, in some embodiments, the first user device 312 and the second user device 322 may be one in the same. In that case, a single user device engages in both of the sessions 301 and 302. Because the principles described herein are performed in the context of a computing system, some introductory discussion of a computing system will be described with respect to FIG. 8.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
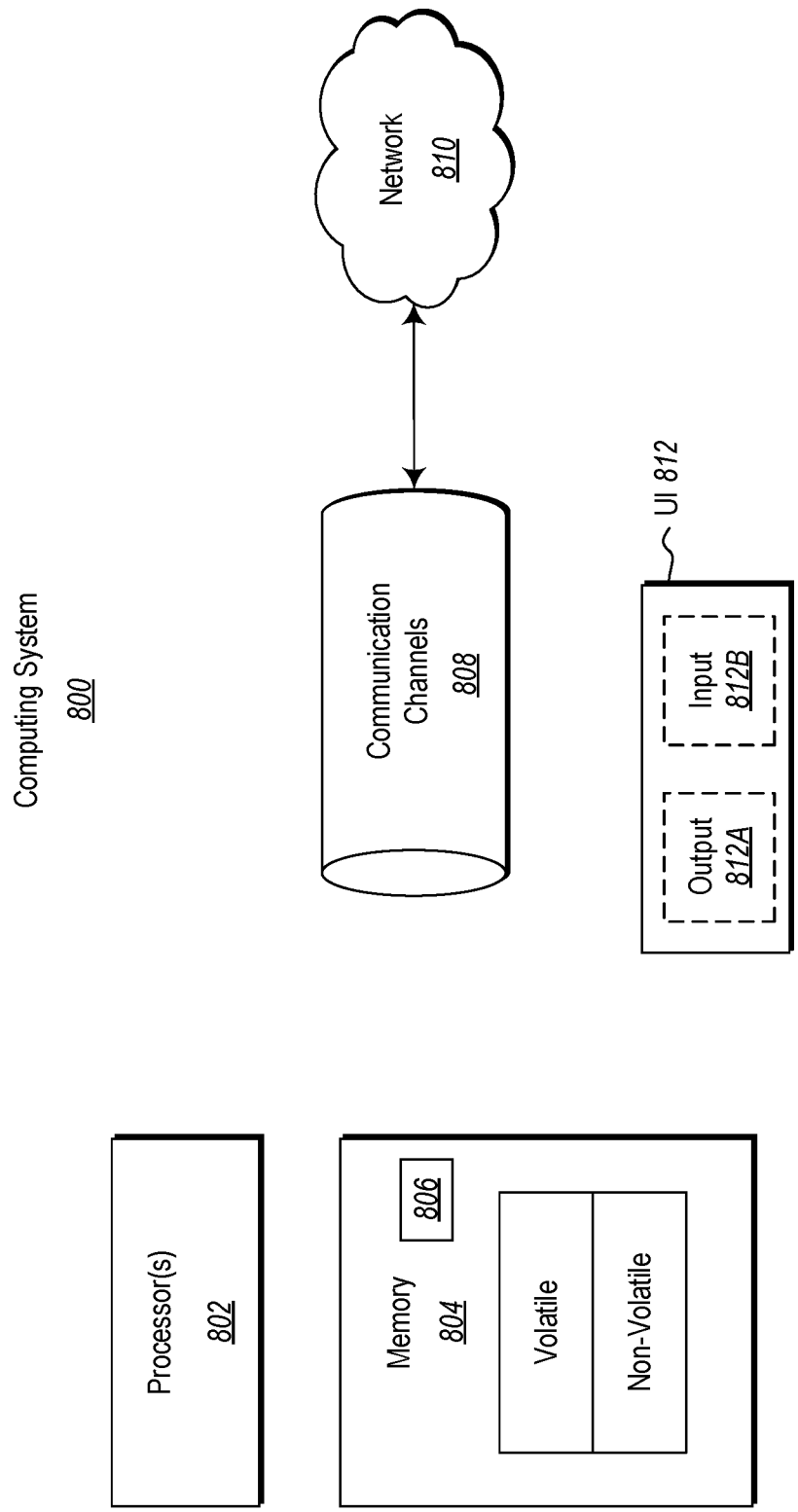
FIG. 8 illustrates an example computing system in which the principles described herein may be employed.

As illustrated in FIG. 8, in its most basic configuration, a computing system 800 includes at least one hardware processing unit 802 and memory 804. The processing unit 802 includes a general-purpose processor. Although not required, the processing unit 802 may also include a field programmable gate array (FPGA), an application specific integrated circuit (ASIC), or any other specialized circuit. In one embodiment, the memory 804 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 800 also has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, virtual or augmented reality, holograms and so forth. Examples of input mechanisms 812B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that assists a user in cross-section acquisition of a verifiable credential, said computing system comprising:
    one or more processors; and
    one or more computer-readable media having thereon computer-executable instructions that are executable by the one or more processors to cause the computing system to:
        establish a first session associated with a user of the computing system;
        determine that the verifiable credential associated with the user is to be generated;
        generate, by the computing system, a user secret known to the first session and to the user;
        acquire an identity token that includes (i) a claim about an authentication of the user and (ii) the user secret;
        cause the identity token to be provided to a second computing system in control of the user for use by the second computing system in using a second session to acquire the verifiable credential on condition of the user also proving knowledge of the user secret in the second session; and
        in response to receiving a presentation of the verifiable credential after the verifiable credential was acquired in the second session, verify one or more verifiable claims of the presented verifiable credential.

2. The computing system in accordance with claim 1, wherein causing the identity token to be provided to the second computing system includes causing a visual code to be displayed that is configured to be scanned by the second computing system.

3. The computing system in accordance with claim 1, wherein generating the user secret includes:
    selecting the user secret; and
    causing the user secret to be rendered to the user.

4. The computing system in accordance with claim 1, the user secret being a character sequence.

5. The computing system in accordance with claim 1, the user secret being an image.

6. The computing system in accordance with claim 1, wherein acquiring the identity token comprises (i) requesting that an authentication server generate the identity token with the user secret, and (ii) detecting receipt of the identity token from the authentication server.

7. The computing system in accordance with claim 1, the verifiable credential including a claim about the authentication included in the identity token.

8. The computing system in accordance with claim 1, the identity token being encrypted by a public key associated with the second computing system.

9. A second computing system that obtains a verifiable credential in a second session using an identity token generated in a first session, said second computing system comprising:
    one or more processors; and
    one or more computer-readable media having thereon computer-executable instructions that are executable by the one or more processors to cause the second computing system to:
        acquire an identity token from a first computing system, the identity token comprising (i) a claim about an authentication of a user and (ii) a user secret shared by the first session and the user, the user secret being generated by the first computing system;
        establish the second session with an issuer system that issues the verifiable credential;
        provide the identity token to the issuer system with a request to issue the verifiable credential based on the identity token;
        prompt the user, who is using the second computing system, to prove knowledge of the user secret;
        if the user of the second computing system responds to the prompt with user input, provide information representing the user input to the issuer system; and
        in response to receiving the requested verifiable credential from the issuer system, present the verifiable credential to the first computing system.

10. The second computing system in accordance with claim 9, wherein acquiring the identity token from the first computing system comprises scanning a visual code that is displayed by the first computing system and that represents the identity token.

11. The computing system in accordance with claim 10, the verifiable credential including a claim about the authentication of the user present within the identity token.

12. The computing system in accordance with claim 10, the verifiable credential including one or more claims about the authentication of the user present within the identity token.

13. A method for issuing a verifiable credential in a second session, the method comprising:
    receiving, from a requesting computing system, a request for the verifiable credential having claims about an end-user;
    receiving an encrypted identity token associated with the request, the identity token including (i) a claim about an authentication of an end-user performed in a first session between the requesting computing system and a first session computing system and (ii) a user secret generated by the first session computing system for the first session;
    validating the received identity token;
    receiving proof that a user of the requesting computing system knows the user secret;
    in response to receiving the proof that the user of the requesting computing system knows the user secret, determining that the user of the requesting computing system is the end-user about which authentication claims are made in the identity token;

generating the verifiable credential that includes verifiable claims that rely upon one or more of the claims about the authentication of the end-user that were included within the identity token;

causing the verifiable credential to be provided to the requesting computing system;

receiving, from a second requesting computing system, a second request for the verifiable credential having claims about the end-user;

receiving a second encrypted identity token associated with the second request, the second encrypted identity token containing second claims about an authentication of the end-user and about a second user secret; and validating the received second encrypted identity token;

wherein said generation of the verifiable credential is performed in response to receiving proof that the user of the requesting computing system knows the second user secret.

14. The method in accordance with claim 13, the verifiable credential including one or more of the claims about the authentication of the end-user that were included that were included within the encrypted identity token.

15. The method in accordance with claim 13, the verifiable credential also including one or more claims about the authentication of the end-user that rely upon one or more claims included within the second encrypted identity token.

16. The method in accordance with claim 13, the verifiable credential also including one or more claims about the authentication of the end-user that were included within the second encrypted identity token.

17. The method in accordance with claim 13, the first computing system being a different computing system than the second computing system.

18. The system of claim 1, wherein the computer-executable instructions are structured to be further executable by the one or more processors to cause the computing system to select the user secret.

19. The system of claim 1, wherein the computer-executable instructions are structured to be further executable by the one or more processors to cause the computing system to display the user secret.

* * * * *